United States Patent [19]

Adamson

[11] 4,313,462
[45] Feb. 2, 1982

[54] SEQUENTIALLY OPERATED VALVE STRUCTURE

[75] Inventor: Kenneth S. Adamson, Walnut Creek, Calif.

[73] Assignee: Grove Valve and Regulator Company, Oakland, Calif.

[21] Appl. No.: 195,948

[22] Filed: Oct. 10, 1980

[51] Int. Cl.³ ............................................. F16K 15/00
[52] U.S. Cl. .................................. 137/512.1; 137/492; 137/512.3; 137/529; 137/853; 251/61.1
[58] Field of Search ............. 137/512.1, 512.15, 512.3, 137/599, 853, 487, 489, 492, 628; 251/61.1

[56] References Cited

U.S. PATENT DOCUMENTS 3,727,623  4/1973  Robbins ......................... 251/61.1 X
4,138,087  2/1979  Kruse ............................... 137/489 X

FOREIGN PATENT DOCUMENTS 240913  10/1962  Australia ........................... 251/61.1
184415  1/1956  Austria ............................... 251/61.1
519031  3/1940  United Kingdom ............. 137/512.3

Primary Examiner—Robert G. Nilson
Attorney, Agent, or Firm—Melvin R. Stidham

[57] ABSTRACT

In a valve wherein a flexible tube is stretched around a circular barrier between inlet and outlet slots and is conditioned to enable flow in an annular path around the barrier when upstream pressure overcomes pressure in a control jacket around the tube, the improvement comprising a second flow path directly through the barrier, which is normally closed off by a poppet valve engagable with a seat around the passage. A spring augmented by a control pressure biases the valve toward closed position and is preferably set so that, only after capacity of the flexible tube is reached or approached, does the poppet valve open to answer the need for high pressure demand downstream or for relief of a high pressure surge upstream.

6 Claims, 2 Drawing Figures

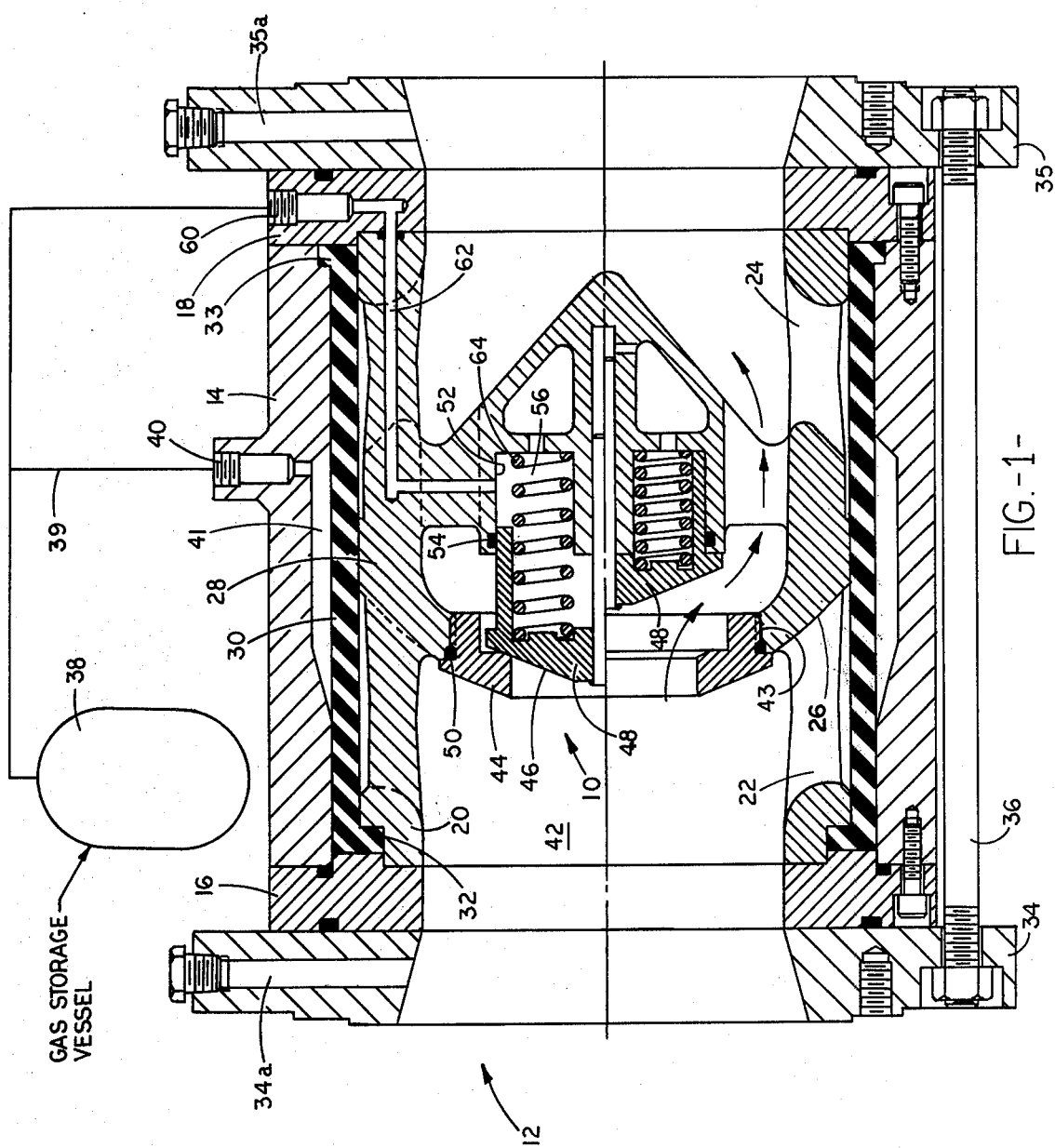
FIG.-1-

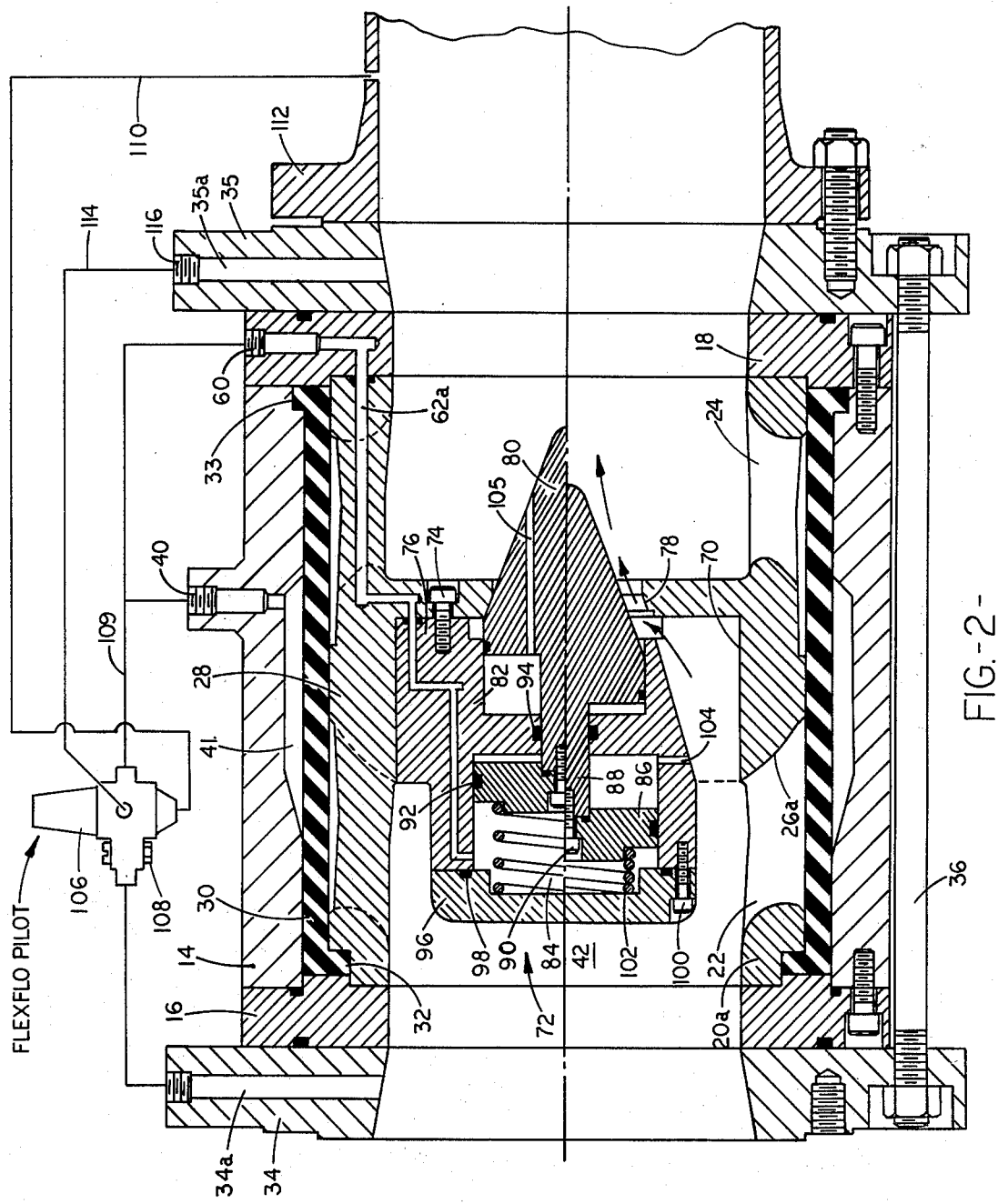
FIG.-2-

SEQUENTIALLY OPERATED VALVE STRUCTURE

BACKGROUND OF THE INVENTION

Valves of the expansible tube type, which open to enable flow when upstream pressure overcomes a jacket pressure are commonly in use for regulating service and for relieving excessive pressures and undesirable pipeline surges. Such valves are exceptionally efficient for sensitive control of pressures over a narrow band and have proven ideal for modulating control. However, they have limited capacity and, therefore, limited capability of response to demands for high volume flow.

OBJECTS OF THE INVENTION

It is an object of this invention to provide a valve which will function to maintain fine pressure control over a narrow band but which has high capacity capabilities on demand.

It is a further object of this invention to provide an expansible tube type valve with increased flow range.

Other objects and advantages of this invention will become apparent from the description to follow, particularly when read in conjunction with the accompanying drawing.

SUMMARY OF THE INVENTION

In carrying out this invention, there is provided an expansible tube valve of the type having a slotted cage spaced within a housing, with a flexible tube stretched over a central barrier. Flow is enabled when pressure in the upstream side overcomes a jacket pressure around the expansible tube, enabling flow out through slots on the upstream side, around the barrier and then back through slots on the downstream side. A large capacity flow passage is provided directly through the barrier and a poppet valve, which is slidably mounted on the barrier is biased against a valve seat by means of a spring, augmented by a control pressure. The poppet is biased toward open position by the upstream pressure, and the spring and control pressure are preferably set so that the poppet valve remains closed until sometime after the expansible tube valve has opened and, preferably, when it is at or near flow capacity. Hence the fine pressure control is handled by the flexible tube and the poppet valve is opened only to meet high flow demands.

BRIEF DESCRIPTION OF THE DRAWINGS

In the drawings:
FIG. 1 is a vertical section view of one embodiment of this invention;
FIG. 2 is a vertical section view of another embodiment.

DESCRIPTION OF A PREFERRED EMBODIMENTS

The Embodiment of FIG. 1

The coaxial flow valve 10 of this invention may be incorporated into a conventional valve 12 of the expansible tube type. The flexible tube valve 12 may include a generally cylindrical body band 14 which is clamped between upstream and downstream end closures 16 and 18. Also clamped between the end closures 16 and 18 is a central core or cage 20 having an annular row of upstream slots 22 and downstream slots 24 on opposite sides of a circular barrier or dam 26 having a cylindrical outer sealing surface 28 around which is stretched a flexible tube 30. The tube is clamped at its ends 32 and 33, and the end closures 16 and 18 are clamped between pipeline connection flanges 34 and 35, as by means of studs 36.

In operation a control pressure fluid from a suitable source, such as a gas storage vessel 38 is directed by a duct 39 to port 40 opening into a control chamber or jacket 41. Hence, when pressure in the upstream flow passage 42 overcomes the jacket pressure 41, the tube 30 is stretched outward to enable flow around the barrier 26.

A threaded opening 43 through the barrier 26 receives a valve seat assembly 44, which is sealingly engaged by the leading face 46 of a poppet valve 48. The threads around the valve seat 44 are sealed off at 50. The poppet valve 48 is slidable on an internal cylindrical surface 52 in the barrier 26 and the space behind it is sealed off at 54 to form a closed control chamber 56.

A control pressure from a suitable source may be introduced at port 60 through duct 62 into the control chamber 56 to augment the action of a spring 64 in biasing the poppet valve 48 against the seat 44. As indicated in FIG. 1, the control pressure in chamber 56 may be from the same source 38 as that for the jacket 42 around the expansible tube, but this invention is not so limited. In any event, the control pressure in chamber 56 and the strength of the spring 64 are selected so that, considering the area of the leading face 46 of the poppet valve exposed to pressure in the upstream passage 42, the poppet 48 will open only after the expansible tube 30 has opened and, preferably, after it has reached near flow capacity. When this occurs, the poppet 48 will move to its retracted position shown in the lower half of FIG. 1, allowing flow as indicated by the arrows through to the downstream side.

After the demand for capacity flow has been satisfied, the pressure in a control chamber 56 again overcomes the upstream pressure to move the poppet valve back to closed position shown in the upper half of FIG. 1, while the expansible tube 30 continues its fine modulation control over a narrow band.

The Embodiment of FIG. 2

Here, the barrier 26a is bored at 70 to receive the poppet valve assembly 72, which may be secured in place as by means of cap screws 74, which are threaded into radial struts 76 spaced around the assembly 72 at, say every 120 degrees. The barrier 26a is also counterbored at the downstream side to form an annular valve seat 78, which is engagable by a poppet 80 slidable in a bore 82 in the valve assembly 72.

A control chamber 84 slidably receives a piston 86 which is secured onto a trailing portion 88 of a poppet, as by means of a cap screw 90. The piston is sealed at 92 and the trailing portion 88 of the poppet is sealed at 94.

The control chamber 84 is closed off by a closure cap 96 with seal 98 and bolted at 100. As in the embodiment of FIG. 1, the pressure fluid in the chamber 84 is augmented by a spring 102 acting against the back of the piston to bias the poppet 80 towards closed position shown the upper part of FIG. 2. As in the first embodiment, a control pressure introduced at port 60 to flow through duct 62a into the control chamber 84. Also as in the first embodiment, the control pressure may be the same pressure as is introduced at 40 to the jacket 41 surrounding the expansible tube 30.

In operation, the flexible tube valve will normally handle the fine control regulation of pressure. However, when fluid in the upstream flow passage 42, entering through sensing port 104, is sufficient to overcome the control pressure in chamber 84, augmented by the spring 102, the piston 86 is driven to the left in FIG. 2 to retract the poppet 80 to the position shown in the lower part of FIG. 2, away from its seat, allowing flow, as indicated by the arrows. A balancing duct 105 is bored through the poppet to prevent entrapment of fluid in the chamber 82.

Alternative Operations

Either embodiment of FIGS. 1 and 2 may be used selectively for surge or safety relief or for regulating services. For example, for relief operation, the ducts 34a and 35a may be closed off as shown and the ports 40 and 60 connected to the gas storage vessel 58 to maintain the jacket 41 and control chamber 56 or 84 at a predetermined pressure. Then, if the pressure in the jacket 41 is exceeded, the expansible tube 38 is stretched away from its sealing surface 28 by upstream pressure for initial relief. If this is not sufficient to meet the demand, the poppet valve 48 or 80 is retracted against the pressure in the control chamber 56 or 84 to allow high capacity flow, as indicated by the arrows.

For regulating service, a pilot valve 106 may be provided so that upstream pressure tapped from a port 34a in the upstream mounting flange 34 is directed to the pilot 106 through an orifice controlled at 108 and into the flexible tube jacket 41 at port 40 and to the control chamber 56 or 84 through port 60. A sensing line 110 is tapped into the downstream pipeline 112 so that downstream pressure can be sensed against a spring-biased diaphragm or the like, as in common practice. In the event that downstream pressure deteriorates, the pilot valve is opened to allow flow from the port 40 back to the pilot 106 and then out through line 114 to exhaust jacket pressure at port 116 in the downstream mounting flange 38. In the event that this action does not fill the demand the pressure in control chamber 56 or 84 is overcome to cause operation of the poppet 44 or 80.

While this invention has been described in conjunction with preferred embodiments thereof, it is obvious that modifications and changes therein may be made by those skilled in the art to which it pertains without departing from the spirit and scope of this invention, as defined by the claims appended hereto.

What is claimed is:

1. In a flexible tube valve comprising:
   a housing with coaxially aligned inlet and outlet flow passages;
   a generally cylindrical, tubular cage in said housing coaxial with said flow passages and having spaced rows of inlet and outlet slots around it;
   a cylindrical barrier across said cage intermediate said rows of slots;
   a flexible tube stretched over said cage and sealed at opposite ends to said housing;
   a space in said housing forming a jacket around said flexible tube; and
   a port in said housing for introducing a control pressure into said jacket.
   the improvement comprising:
   an inlet flow passage extension through said barrier;
   a valve seat around said flow passage;
   a poppet valve slidable on said barrier and engagable with said valve seat;
   portions on said poppet valve being exposed to upstream fluid pressure to be biased thereby toward open, retracted position;
   a sealed chamber in said barrier behind said poppet valve; and
   duct means connecting said chamber with a source of pressurized fluid.
2. The combination defined by claim 1 including:
   biasing means in said chamber forcing said poppet valve toward said valve seat.
3. The combination defined by claim 2 wherein:
   said biasing means and the pressure of said pressurized fluid are selected in view of the area of said exposed portions so that said poppet valve is forced away from said seat after fluid pressure in said inlet flow passage has overcome pressure in said jacket.
4. The combination defined by claim 2 wherein:
   said biasing means and the pressure of said pressurized fluid are selected in view of the area of said exposed portions, so that said poppet valve is forced away from said seat after fluid pressure in said inlet flow passage has stretched said flexible tube outward to full flow capacity.
5. The combination defined by claim 2 wherein:
   said valve seat is at the upstream end of said flow passageway;
   said poppet valve faces upstream of said flexible tube valve; and
   said biasing means and said pressurized fluid bias said poppet valve upstream toward said valve seat.
6. The combination defined by claim 1 wherein said chamber is a cylinder and including:
   a piston carried by said poppet valve slidable in said cylinder;
   said exposed portions being on a face of said piston.

* * * * *